(12) United States Patent
Jang et al.

(10) Patent No.: US 12,256,329 B2
(45) Date of Patent: Mar. 18, 2025

(54) METHOD AND APPARATUS FOR TRANSMITTING AND RECEIVING DATA IN WIRELESS COMMUNICATION SYSTEM

(71) Applicant: Samsung Electronics Co., Ltd., Suwon-si (KR)

(72) Inventors: Jaehyuk Jang, Suwon-si (KR); Soenghun Kim, Suwon-si (KR); Anil Agiwal, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 279 days.

(21) Appl. No.: 17/640,941

(22) PCT Filed: Jun. 18, 2020

(86) PCT No.: PCT/KR2020/007879
§ 371 (c)(1),
(2) Date: Mar. 7, 2022

(87) PCT Pub. No.: WO2021/060669
PCT Pub. Date: Apr. 1, 2021

(65) Prior Publication Data
US 2022/0338118 A1 Oct. 20, 2022

(30) Foreign Application Priority Data

Sep. 24, 2019 (KR) .................. 10-2019-0117568

(51) Int. Cl.
*H04W 52/02* (2009.01)
*H04B 7/06* (2006.01)
*H04W 76/28* (2018.01)

(52) U.S. Cl.
CPC ...... *H04W 52/0229* (2013.01); *H04B 7/0626* (2013.01); *H04W 52/0216* (2013.01); *H04W 76/28* (2018.02)

(58) Field of Classification Search
CPC ............ H04W 52/0229; H04W 76/28; H04W 52/0216; H04B 7/0626
(Continued)

(56) References Cited

U.S. PATENT DOCUMENTS 10,356,839 B2   7/2019  Ang et al.
10,673,507 B2   6/2020  Onggosanusi et al.
(Continued)

FOREIGN PATENT DOCUMENTS

CN    108352879 A    7/2018
CN    108476049 A    8/2018
(Continued)

OTHER PUBLICATIONS

Japan Office Action dated Feb. 7, 2023, issued in Japanese Application No. 2022-516190 .
(Continued)

*Primary Examiner* — Mark G. Pannell
(74) *Attorney, Agent, or Firm* — Jefferson IP Law, LLP (57) ABSTRACT

The present disclosure relates to a method and apparatus for transmitting and receiving data in a wireless communication system. An operating method of a terminal in a wireless communication system may include receiving configuration information related to discontinuous reception (DRX) through radio resource control (RRC) signaling from a base station, wherein the configuration information related to the DRX includes information related to a cycle of the DRX and information related to a timer of a duration for monitoring a physical downlink control channel (PDCCH) within the cycle of the DRX, receiving configuration information about downlink control information (DCI) related to an indication of wake up in the DRX, through RRC signaling from the base station, identifying the wake up in the DRX based on the DCI, and when the wake up is not identified in the DRX, (Continued)

performing periodic channel state information (CSI) reporting, based on whether information indicating the periodic CSI reporting is included in the configuration information about the DCI.

13 Claims, 8 Drawing Sheets

(58) Field of Classification Search
USPC .......................................................... 370/311
See application file for complete search history.

(56) References Cited

U.S. PATENT DOCUMENTS

| | | | |
|---|---|---|---|
| 2018/0249531 A1 | 8/2018 | Feuersaenger et al. | |
| 2018/0331742 A1 | 11/2018 | Yum et al. | |
| 2019/0052413 A1 | 2/2019 | Babaei et al. | |
| 2019/0239189 A1* | 8/2019 | Hwang | H04W 68/02 |
| 2019/0312635 A1* | 10/2019 | Ang | H04L 5/0091 |
| 2019/0387572 A1* | 12/2019 | Nam | H04W 52/0235 |
| 2020/0022011 A1* | 1/2020 | Lee | H04W 24/10 |
| 2020/0351786 A1* | 11/2020 | Koskela | H04W 52/0235 |
| 2020/0367087 A1 | 11/2020 | Lim et al. | |
| 2021/0068055 A1* | 3/2021 | Nam | H04L 5/0053 |
| 2021/0203468 A1* | 7/2021 | Yi | H04L 5/0098 |
| 2021/0298114 A1* | 9/2021 | Nam | H04W 76/28 |
| 2022/0159574 A1* | 5/2022 | Islam | H04W 52/0219 |

FOREIGN PATENT DOCUMENTS

| | | |
|---|---|---|
| CN | 110267329 A | 9/2019 |
| KR | 10-2019-0055102 A | 5/2019 |
| KR | 10-2020-0129855 A | 11/2020 |
| WO | 2018/203822 A1 | 11/2018 |

OTHER PUBLICATIONS

Samsung, PDCCH-based power saving signal/channel, 3GPP TSG RAN WG1 #97 Reno, USA, May 13-17, 2019, R1-1906980.
Samsung, On Supporting Wake-up signal, 3GPP TSG-RAN WG2#106 Reno, USA, May 13-17, 2019, R2-1907849.
Apple Inc., Design of PDCCH-based Power Saving Signal and Channel, 3GPP TSG RAN WG1 #97 Reno, USA, May 13-17, 2019, R1-1907345.
Vivo, C-DRX enhancement for power saving with WUS, 3GPP TSG-RAN WG2 Meeting #105bis Xi'an, China, Apr. 8-12, 2019, R2-1903199.
Extended European Search Report dated Sep. 16, 2022, issued in European Patent Application No. 20867400.2.
Indian Office Action dated Sep. 9, 2022, issued in Indian Patent Application No. 202217020241.
Zte et al., Consideration on the Impact of WUS Signal, 3GPP TSG-RAN WG2 Meeting #107, R2-1910403, Prague, Czech Republic, Aug. 16, 2019.
Mediatek Inc, Interaction between power saving signal and DRX, 3GPP TSG-RAN WG2 Meeting #107, R2-1910085, Prague, Czech Republic, Aug. 15, 2019.
CATT, Summary of PDCCH-based Power Saving Signal/Channel, 3GPP TSG RAN WG1 Meeting #98, R1-1909732, Sep. 3, 2019.
International Search Report dated Sep. 11, 2020, issued in International Patent Application No. PCT/KR2020/007879.
Chinese Office Action dated Mar. 1, 2024, issued in Chinese Patent Application No. 202080066928.3.
European Office Action dated May 14, 2024, issued in European Patent Application No. 20867400.2.
Chinese Notice of Allowance dated Jan. 13, 2025, issued in Chinese Application No. 202080066928.3.

* cited by examiner

METHOD AND APPARATUS FOR TRANSMITTING AND RECEIVING DATA IN WIRELESS COMMUNICATION SYSTEM

TECHNICAL FIELD

The present disclosure relates to a method and apparatus for transmitting and receiving data in a wireless communication system. More particularly, the present disclosure relates to a method and apparatus for transmitting channel state information (CSI).

BACKGROUND ART

In order to meet increasing demand with respect to wireless data traffic after the commercialization of 4th generation (4G) communication systems, efforts have been made to develop 5th generation (5G) or pre-5G communication systems. For this reason, 5G or pre-5G communication systems are called 'beyond 4G network' communication systems or 'post long term evolution (post-LTE)' systems. In order to achieve high data rates, the implementation of 5G communication systems in an ultra-high frequency millimeter-wave (mmWave) band (e.g., a 60-gigahertz (GHz) band) is being considered. In order to reduce path loss of radio waves and increase a transmission distance of radio waves in the ultra-high frequency band for 5G communication systems, various technologies such as beamforming, massive multiple-input and multiple-output (massive MIMO), full-dimension MIMO (FD-MIMO), array antennas, analog beamforming, and large-scale antennas are being studied. In order to improve system networks for 5G communication systems, various technologies such as evolved small cells, advanced small cells, cloud radio access networks (Cloud-RAN), ultra-dense networks, device-to-device communication (D2D), wireless backhaul, moving networks, cooperative communication, coordinated multi-points (CoMP), and interference cancellation have been developed. In addition, for 5G communication systems, advanced coding modulation (ACM) technologies such as hybrid frequency-shift keying (FSK) and quadrature amplitude modulation (QAM) (FQAM) and sliding window superposition coding (SWSC), and advanced access technologies such as filter bank multi-carrier (FBMC), non-orthogonal multiple access (NOMA), and sparse code multiple access (SCMA), have been developed.

The Internet has evolved from a human-based connection network, where humans create and consume information, to the Internet of things (IoT), where distributed elements such as objects exchange information with each other to process the information. Internet of everything (IoE) technology has emerged, in which the IoT technology is combined with, for example, technology for processing big data through connection with a cloud server. In order to implement the IoT, technology elements such as sensing technology, wired/wireless communication and network infrastructures, service interface technology, and security technology are required, and thus technologies for inter-object connection, such as sensor network, machine to machine (M2M) communication, or machine-type communication (MTC), has recently been studied. In the IoT environment, intelligent Internet technology (IT) services may be provided to collect and analyze data obtained from connected objects to create new value in human life. As existing information technology (IT) and various industries converge and combine with each other, the IoT may be applied to various fields such as smart homes, smart buildings, smart cities, smart cars or connected cars, smart grids, health care, smart home appliances, and advanced medical services.

Various attempts are being made to apply 5G communication systems to the IoT network. For example, technologies related to sensor networks, M2M communication, and MTC are being implemented by using 5G communication technology using beamforming, MIMO, and array antennas. The application of cloud radio access network (Cloud-RAN) as the above-described big data processing technology may also be an example of convergence of 5G communication technology and IoT technology.

Because various services may be provided due to the above-described development of wireless communication systems, methods for effectively providing these services are required.

DESCRIPTION OF EMBODIMENTS

Solution to Problem

Based on the discussions described above, the present disclosure provides an apparatus and method for transmitting channel state information (CSI) in a wireless communication system.

Advantageous Effects of Disclosure

Disclosed embodiments provide an apparatus and method capable of effectively reporting a channel state in a wireless communication system.

BEST MODE

According to an embodiment of the present disclosure, an operating method of a terminal in a wireless communication system includes: receiving configuration information related to discontinuous reception (DRX), from a base station; periodically receiving a wake up signal (WUS), based on the configuration information; identifying whether the terminal is activated to monitor scheduling of the base station, based on the WUS; and transmitting channel state information (CSI) based on a result of the identification to the base station.

According to an embodiment of the present disclosure, an operating method of a terminal in a wireless communication system includes: receiving configuration information related to discontinuous reception (DRX) through radio resource control (RRC) signaling from a base station, wherein the configuration information related to the DRX includes information related to a cycle of the DRX and information related to a timer of a duration for monitoring a physical downlink control channel (PDCCH) within the cycle of the DRX; receiving configuration information about downlink control information (DCI) related to an indication of wake up in the DRX, through RRC signaling from the base station; identifying the wake up in the DRX based on the DCI; and when the wake up is not identified in the DRX, performing periodic channel state information (CSI) reporting, based on whether information indicating the periodic CSI reporting is included in the configuration information about the DCI.

According to an embodiment of the present disclosure, a terminal in a wireless communication system includes: a transceiver; and at least one processor configured to receive configuration information related to discontinuous reception (DRX), through radio resource control (RRC) signaling from a base station, wherein the configuration information related to the DRX includes information related to a cycle of the DRX and information related to a timer of a duration for monitoring a physical downlink control channel (PDCCH) within the cycle of the DRX, receive configuration information about downlink control information (DCI) related to an indication of wake up in the DRX, through RRC signaling from the base station, identify the wake up in the DRX based on the DCI, and when the wake up is not identified in the DRX, perform periodic channel state information (CSI) reporting, based on whether information indicating the periodic CSI reporting is included in the configuration information about the DCI.

According to an embodiment of the present disclosure, a computer-readable recording medium has embodied thereon a program for performing a method including: receiving configuration information related to discontinuous reception (DRX), through radio resource control (RRC) signaling from a base station, wherein the configuration information related to the DRX includes information related to a cycle of the DRX and information related to a timer of a duration for monitoring a physical downlink control channel (PDCCH) within the cycle of the DRX; receiving configuration information about downlink control information (DCI) related to an indication of wake up in the DRX, through RRC signaling from the base station; identifying the wake up in the DRX based on the DCI; and when the wake up is not identified in the DRX, performing periodic CSI reporting, based on whether information indicating the periodic CSI reporting is included in the configuration information about the DCI.

Mode of Disclosure

Embodiments of the present disclosure will now be described more fully with reference to the accompanying drawings. In the following descriptions of the present disclosure, well-known functions or configurations are not described in detail because they would obscure the present disclosure with unnecessary details. The terms used herein are those defined in consideration of functions in the present disclosure, and may vary according to the intention of users or operators, precedents, etc. Hence, the terms used herein have to be defined based on the meaning of the terms together with the descriptions throughout the specification.

The advantages and features of the present disclosure, and methods of achieving the same, will become apparent with reference to embodiments of the present disclosure described below in detail in conjunction with the accompanying drawings. The present disclosure may, however, be embodied in many different forms and should not be construed as limited to embodiments of the present disclosure set forth herein; rather these embodiments of the present disclosure are provided so that this disclosure will be thorough and complete, and will fully convey the scope of the present disclosure to one of ordinary skill in the art, and the present disclosure is defined only by the accompanying claims. In the specification, the same reference numerals denote the same elements.

It will be understood that each block of flowchart illustrations and combinations of blocks in the flowchart illustrations may be implemented by computer program instructions. Because these computer program instructions may be loaded into a processor of a general-purpose computer, special purpose computer, or other programmable data processing equipment, the instructions, which are executed via the processor of the computer or other programmable data processing equipment generate means for implementing the functions specified in the flowchart block(s). Because these computer program instructions may also be stored in a computer-executable or computer-readable memory that may direct the computer or other programmable data processing equipment to function in a particular manner, the instructions stored in the computer-executable or computer-readable memory may produce an article of manufacture including instruction means that implement the functions specified in the flowchart block(s). Because the computer program instructions may also be loaded onto a computer or other programmable data processing equipment, a series of operational steps may be performed on the computer or other programmable data processing equipment to produce a computer implemented process, and thus the instructions executed on the computer or other programmable data processing equipment may provide steps for implementing the functions specified in the flowchart block(s).

Also, each block may represent a module, segment, or portion of code, which includes one or more executable instructions for implementing specified logical function(s). It should also be noted that in some alternative implementations, the functions noted in the blocks may occur out of the order. For example, two blocks shown in succession may in fact be executed substantially concurrently or the blocks may sometimes be executed in the reverse order, according to the functionality involved.

The term "~unit" used in the present embodiment refers to a software or hardware component, such as a field-programmable gate array (FPGA) or an application-specific integrated circuit (ASIC), which performs certain tasks. However, the term "~unit" does not mean to be limited to software or hardware. A "~unit" may be configured to be in an addressable storage medium or may be configured to operate one or more processors. Thus, a "~unit" may include, by way of example, components, such as software components, object-oriented software components, class components, and task components, processes, functions, attributes, procedures, subroutines, segments of program code, drivers, firmware, microcode, circuitry, data, databases, data structures, tables, arrays, and variables. The functionality provided in components and "~units" may be combined into fewer components and "~units" or may be further separated into additional components and "~units". Furthermore, components and "~units" may be implemented to operate one or more central processing units (CPUs) in a device or a secure multimedia card. Also, a "~unit" in an embodiment may include one or more processors.

In the following descriptions of the present disclosure, well-known functions or configurations are not described in detail because they would obscure the present disclosure with unnecessary details. Hereinafter, embodiments of the present disclosure will be described with reference to the accompanying drawings.

Hereinafter, terms indicating an access node, terms indicating network entities, terms indicating messages, terms indicating an interface between network entities, and terms indicating various pieces of identification information used herein are exemplified for convenience of explanation. Accordingly, the present disclosure is not limited to the terms described below, and other terms indicating objects having equal technical meanings may be used.

Hereinafter, some terms and names defined in the $3^{rd}$ generation partnership project long term evolution (3GPP LTE) standard may be used for convenience of explanation. However, the present disclosure may not be limited to the terms and names, and may also be applied to systems following other standards. In particular, the present disclosure may be applied to 3GPP New Radio (NR) (the 5G mobile communication standard). In the present disclosure, an evolved node B (eNB) may be interchangeably used with a next-generation node B (gNB) for convenience of explanation. That is, a base station described as an eNB may represent a gNB. In the present disclosure, the term "terminals" may refer to not only mobile phones, narrowband Internet of Things (NB-IoT) devices, and sensors but also other wireless communication devices.

Hereinafter, a base station is an entity that allocates resources to a terminal and may be at least one of a gNode B, an eNode B, a node B, a base station (BS), a radio access unit, a base station controller, or a node on a network. A terminal may include a user equipment (UE), a mobile station (MS), a cellular phone, a smartphone, a computer, or a multimedia system capable of performing a communication function. However, the present disclosure is not limited to the above examples.

The present disclosure relates to a method and apparatus for transmitting a channel state report, in a wireless communication system in which a wake up signal (WUS) is configured.

The present disclosure defines a method of reporting a channel state, when discontinuous reception (DRX) is used in a wireless communication system.

In an embodiment of the present disclosure, a terminal may dynamically adjust a method of reporting a channel state according to the amount of transmitted and received data, to reduce power consumption of the terminal.

Figure 1A:
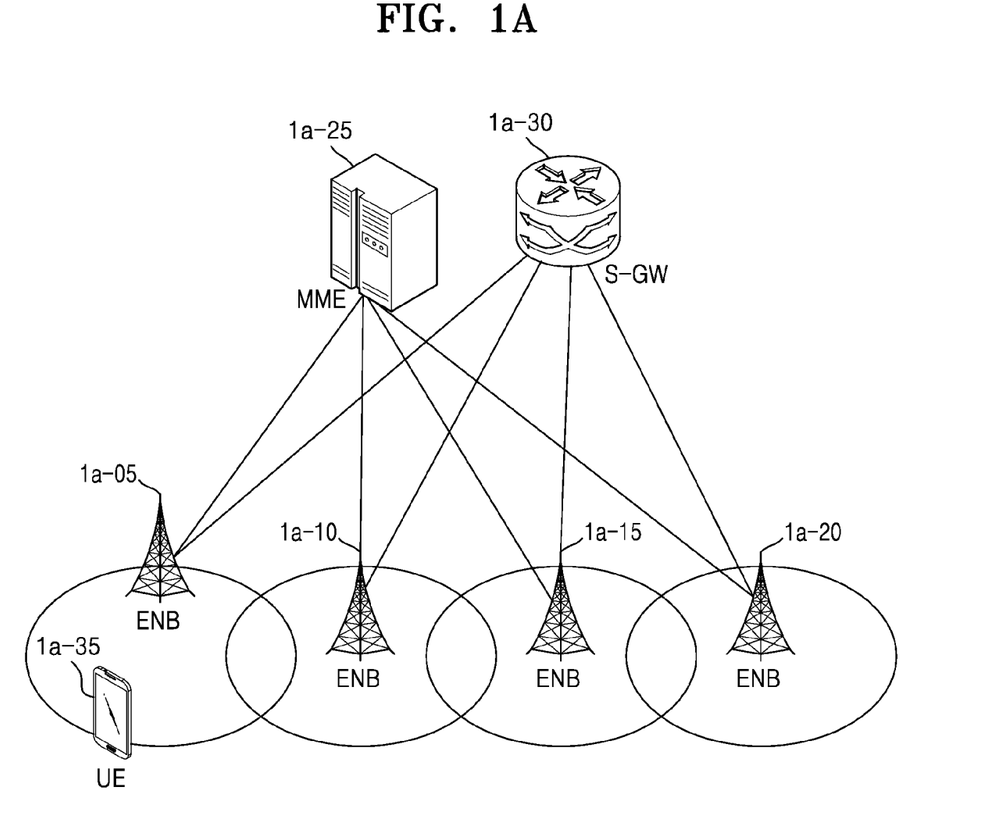
FIG. 1A is a diagram illustrating a structure of a long term evolution (LTE) system, for describing the present disclosure.

FIG. 1A is a diagram illustrating a structure of an LTE system, for describing the present disclosure.

Referring to FIG. 1A, a wireless communication system may include a plurality of base stations 1a-05, 1a-10, 1a-15, and 1a-20, a mobility management entity (MME) 1a-25, and a serving gateway (S-GW) 1a-30. A user equipment (hereinafter, UE or "terminal") 1a-35 may access an external network through the base stations 1a-05, 1a-10, 1a-15, and 1a-20 and the S-GW 1a-30.

The base stations 1a-05, 1a-10, 1a-15, and 1a-20 are access nodes of a cellular network and may provide wireless access to UEs accessing the network. That is, in order to service traffic of users, the base stations 1a-05, 1a-10, 1a-15, and 1a-20 may collect and schedule state information such as a buffer state, an available transmission power state, and a channel state of UEs, thereby supporting connection between the UEs and a core network (CN). The MME 1a-25 is a device capable of performing a mobility management function and a control function on a UE, and may be connected to a plurality of base stations, and the S-GW 1a-30 is a device that provides a data bearer. In addition, the MME 1a-25 and the S-GW 1a-30 may further perform authentication, bearer management, or the like for the UE accessing the network, and may process packets received from the base stations 1a-05, 1a-10, 1a-15, and 1a-20 or packets to be transmitted to the base stations 1a-05, 1a-10, 1a-15, and 1a-20.

Figure 1B:
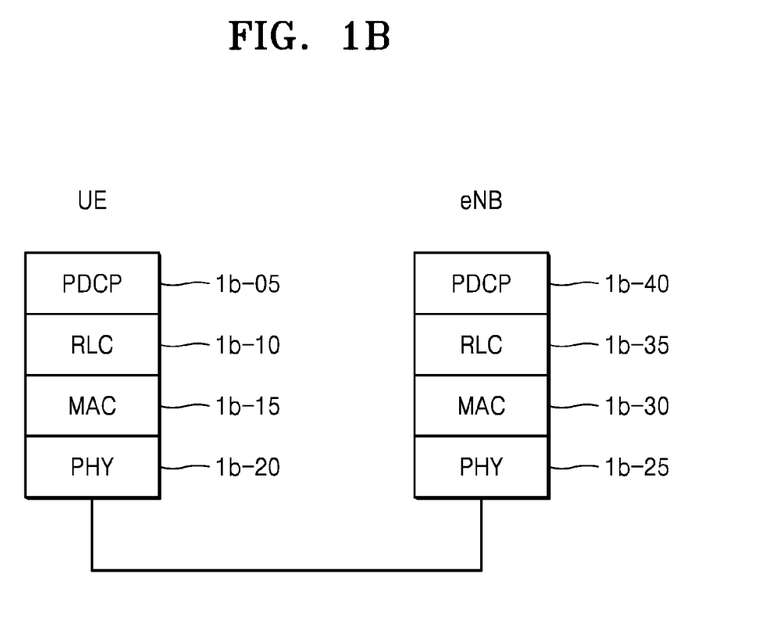
FIG. 1B is a diagram illustrating a radio protocol architecture in an LTE system, for describing the present disclosure.

FIG. 1B is a diagram illustrating a radio protocol architecture in an LTE system, for describing the present disclosure.

Referring to FIG. 1B, a wireless protocol of an LTE system includes packet data convergence protocols (PDCPs) 1b-05 and 1b-40, radio link controls (RLCs) 1b-10 and 1b-35, and medium access controls (MAC) 1b-15 and 1b-30 in a UE and an eNB. The PDCPs 1b-05 and 1b-40 perform an operation of compression/decompression of an Internet protocol (IP) header, and the RLCs 1b-10 and 1b-35 reconfigure a PDCP packet data unit (PDU) to appropriate sizes. The MAC 1b-15 and 1b-30 are connected to a plurality of RLC layers configured for one UE and multiplex RLC PDUs into MAC PDUs and demultiplex RLC PDUs from MAC PDUs. Physical (PHY) layers 1b-20 and 1b-25 channel-code and modulate higher layer data, convert the data into frequency division multiplexing (OFDM) symbols, and transmit the OFDM symbols via a wireless channel, or demodulate OFDM symbols received via a wireless channel, channel-decode the OFDM symbols, and deliver the OFDM symbols to a higher layer. Also, a hybrid automatic repeat request (HARQ) is used in the physical layer for additional error correction, and a receiving end transmits information about whether a packet transmitted from a transmitting end is received, in 1 bit. This is referred to as HARQ ACK/NACK information. Downlink HARQ ACK/NACK information about uplink data transmission may be transmitted via a physical HARQ indicator channel (PHICH), and uplink HARQ ACK/NACK information about downlink data transmission may be transmitted via a physical uplink control channel (PUCCH) or a physical uplink shared channel (PUSCH). Also, the uplink HARQ ACK/NACK information may be used to periodically report the strength and quality of a downlink signal (channel state information (CSI) through the PUCCH. Although the PUCCH is generally transmitted in an uplink of a primary cell (PCell), when supported by the UE, the base stations may let the UE transmit the PUCCH additionally in a secondary cell (SCell), which may be referred to as a PUCCH SCell.

Although not shown in FIG. 1B, radio resource control (RRC) layers exist above the PDCP layers of the UE and the base station, respectively, and the RRC layers may exchange access and measurement-related configuration control messages for radio resource control.

Meanwhile, the PHY layer may correspond to one or more frequencies/carriers. A technology by which a plurality of frequencies are simultaneously configured and used may be referred to as carrier aggregation (CA). The CA may dramatically increase the amount of transmission by the number of subcarriers by additionally using a primary carrier and one or a plurality of subcarriers, instead of using only one carrier, for communication between the UE and the base stations (E-UTRAN NodeB, eNB). In LTE, a cell in a base stations using a primary carrier may be referred to as a primary cell (PCell), and a cell in the base stations using a subcarrier may be referred to as a secondary cell (SCell).

Figure 1C:
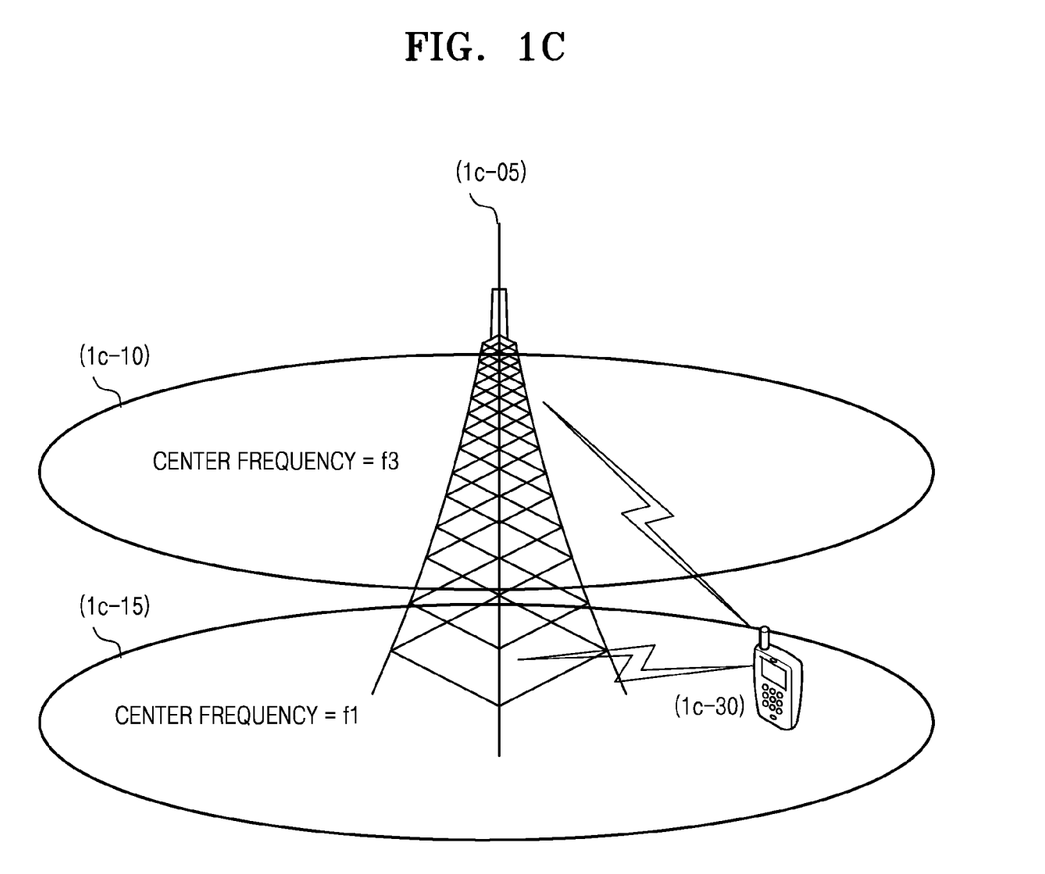
FIG. 1C is a diagram for describing carrier aggregation (CA) in a terminal, according to an embodiment of the present disclosure.

FIG. 1C is a diagram for describing carrier aggregation (CA) in a terminal, according to an embodiment of the present disclosure.

Referring to FIG. 1C, in one base station, multi-carriers may be generally transmitted and received in a plurality of frequency bands. For example, when a carrier 1c-15 having a center frequency of f1 and a carrier 1c-10 having a center frequency of f3 are transmitted in a base station 1c-05, one terminal conventionally transmits and receives data by using one of the two carriers. However, a terminal having a CA capability may simultaneously transmit and receive data from a plurality of carriers. A base station 1c-05 may assign more carriers to a terminal 1c-30 having a CA capability when necessary, to increase a data rate of the terminal 1c-30.

When it is assumed that one cell is formed by one forward carrier and one reverse carrier emitted and received by one base station, CA may be understood as a method by which a terminal simultaneously transmits and receives data via a plurality of cells. Accordingly, a maximum data rate may increase in proportion to the number of aggregated carriers.

In the following descriptions, when a terminal receives data via a forward carrier or transmits data via a reverse carrier, it may mean that the terminal transmits and receives data via a control channel and a data channel provided by a cell corresponding to a frequency band and a center frequency characterizing the carrier. For convenience of explanation, the following embodiments of the present disclosure will be described based on an NR system. However, it should be understood that the embodiments of the present disclosure may be applied to various wireless communication systems that support CA.

Figure 1D:
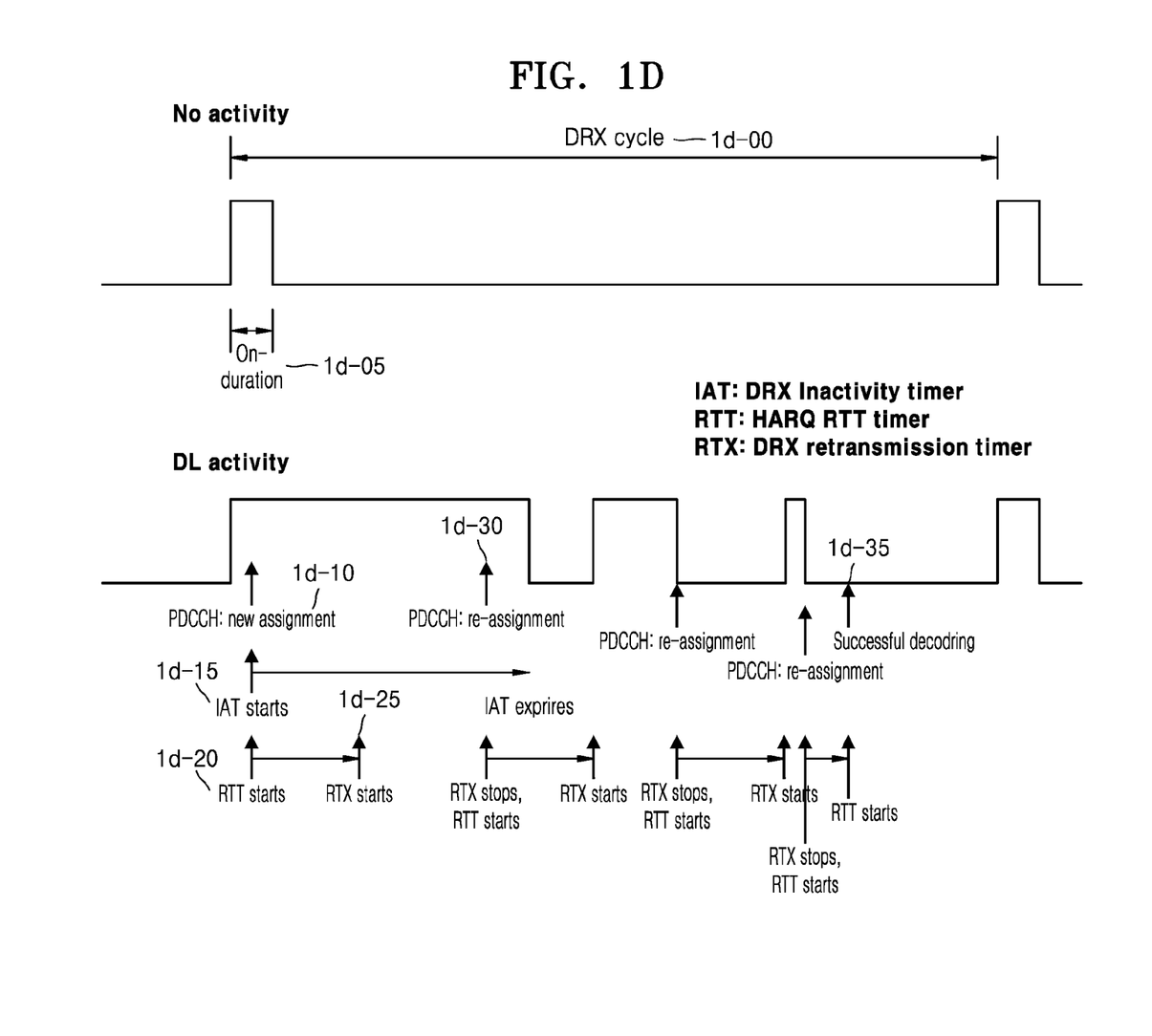
FIG. 1D is a diagram for describing a discontinuous reception (DRX) operation of a terminal, according to an embodiment of the present disclosure.

FIG. 1D is a diagram for describing a discontinuous reception (DRX) operation of a terminal, according to an embodiment of the present disclosure.

In an embodiment, DRX may refer to a technique that the terminal monitors only some physical downlink control channels (PDCCHs) according to configuration information, instead of monitoring all PDCCHs, in order to obtain scheduling information, according to configurations of a base station for minimizing power consumption of a terminal.

Referring to FIG. 1D, a basic DRX operation may have a DRX cycle 1d-00, and may the terminal monitor a PDCCH only for an on-duration 1d-05. In a connected mode, two values, that is, long DRX and short DRX, may be set as the DRX cycle. In general, a long DRX cycle may be applied, and when necessary, a base station may additionally configure a short DRX cycle. When both a long DRX cycle and a short DRX cycle are configured, a terminal may start a short DRX cycle timer and may first repeat the short DRX cycle, and when there is no new traffic until the short DRX cycle timer expires, the terminal may change the short DRX cycle to the long DRX cycle. When scheduling information for a new packet is received through a PDCCH 1d-10 for the on-duration 1d-05, the terminal may start a DRX inactivity timer 1d-15. The terminal may maintain an active state during the DRX inactivity timer. That is, the terminal may continuously perform PDCCH monitoring. Also, the terminal may start an HARQ round trip time (RTT) timer 1d-20. The HARQ RTT timer may be applied to prevent the terminal from unnecessarily monitoring the PDCCH during an HARQ RTT, and the terminal does not need to perform PDCCH monitoring during a timer running time. However, while both the DRX inactivity timer and the HARQ RTT timer simultaneously run, the terminal may continuously perform PDCCH monitoring based on the DRX inactivity timer. When the HARQ RTT timer expires, a DRX retransmission timer 1d-25 may start. In an embodiment, while the DRX retransmission timer runs, the terminal should perform PDCCH monitoring. In general, during a running time of the DRX retransmission timer, scheduling information for HARQ retransmission may be received (1d-30). When the scheduling information is received, the terminal may immediately stop the DRX retransmission timer, and may re-start the HARQ RTT timer. The above operation may be continuously performed until the packet is successfully received (1d-35). Also, additionally, when the base station has no more data to transmit to the terminal while an on-duration timer or the DRX inactivity timer runs, the base station may transmit a DRX command MAC control element (CE) message. The terminal receiving the DRX command MAC CE message may stop both the on-duration timer and the DRX inactivity timer, and when the short DRX cycle is configured, may first use the short DRX cycle and when only the long DRX cycle is configured, may use the long DRX cycle.

Figure 1E:
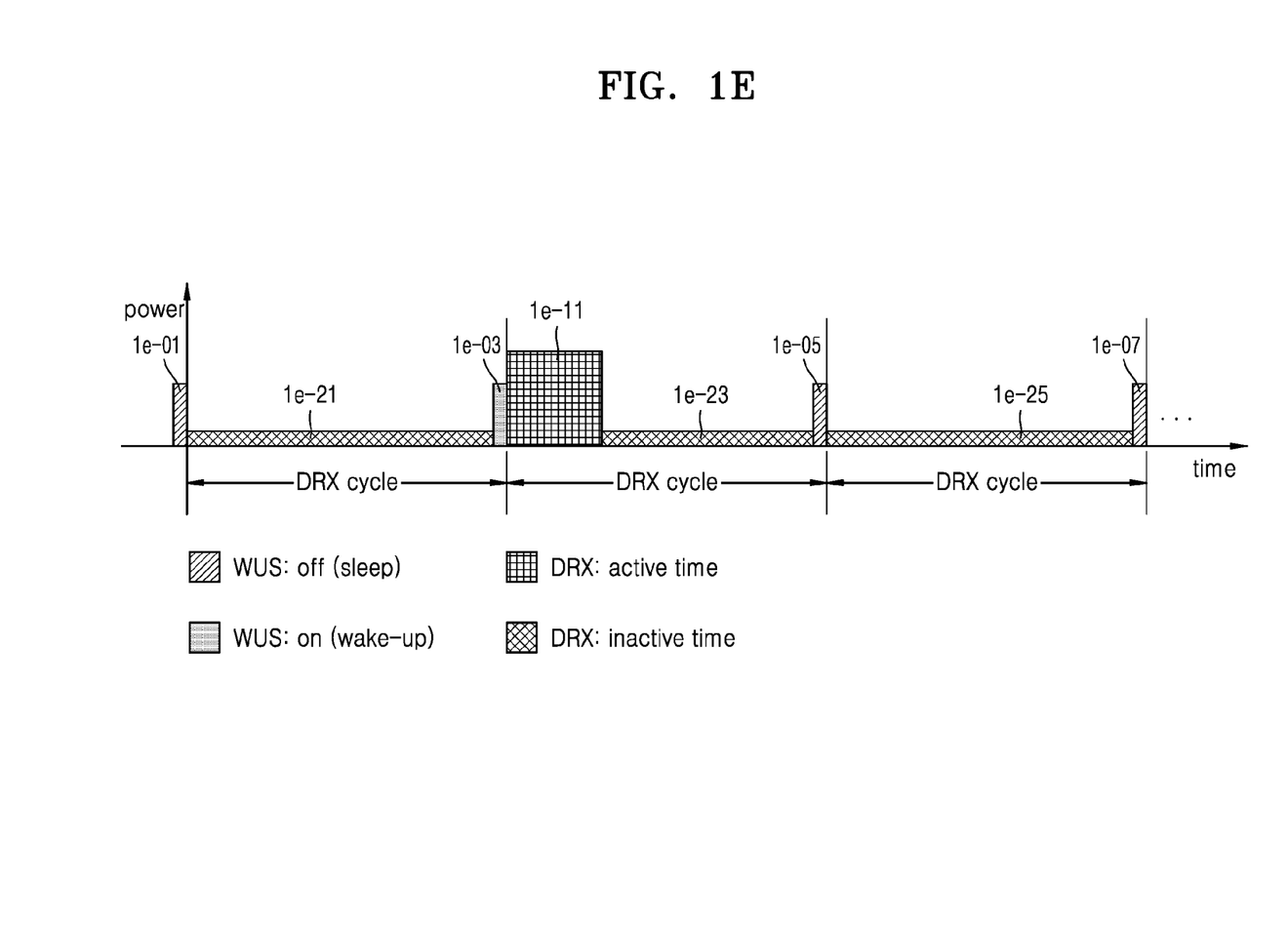
FIG. 1E is a diagram for describing an operation when a wake up signal (WUS) and DRX introduced to further reduce power consumption of a terminal are simultaneously configured, according to an embodiment of the present disclosure.

FIG. 1E is a diagram for describing an operation when a wake up signal (WUS) and DRX introduced to further reduce power consumption of a terminal are simultaneously configured, according to an embodiment of the present disclosure.

Referring to FIG. 1E, a WUS may be a signal 1e-01, 1e-03, 1e-05, or 1e-07 indicating whether a terminal should monitor scheduling from a base station, that is, whether to wake up or to continue to sleep. In an embodiment, the WUS may be a physical channel that is specially designed, or may be new scheduling information (e.g., downlink control information (DCI)) transmitted via a PDCCH. When the WUS is DCI, resources (coreset and search space) through which the DCI is transmitted so that the terminal should monitor a PDCCH may be separately configured. For example, the terminal may determine whether the DCI is transmitted by monitoring only a narrower bandwidth. In this case, power consumption of the terminal may be reduced, when compared to that of the terminal monitoring the PDCCH for general scheduling. This is why power consumed by each of the WUSs 1e-01, 1e-03, 1e-05, and 1e-07 is slightly shorter in a length of a vertical axis than that of an interval 1e-11 in which the terminal wakes up and monitors the PDCCH.

In FIG. 1E, it may be assumed that a time when the WUS is transmitted is ahead of a start point of a DRX cycle (i.e., a point at which an on-duration starts). Although times of the WUS and the onDuration (active time of the DRX) are continuous for convenience of explanation in FIG. 1E, in reality, there may be an offset between the two times (e.g., the times of the WUS and the onDuration) by considering a processing time of the terminal. A position of the WUS may be configured in the same manner as an offset before the arrival time of the onDuration. Alternatively, when the base station configures the resources (coreset and search space) for monitoring the PDCCH as described above, the base station may configure the resources by considering a DRX cycle.

Accordingly, in an embodiment, when the WUS indicates the terminal to wake up (or on or wake-up), the terminal may wake up in the onDuration according to a DRX operation and may monitor the PDCCH according to the defined DRX operation (1e-11) and (1e-23). However, when the WUS is indicated to continuously sleep (off or sleep), the terminal may not operate even in the onDuration, and may continuously maintain an inactive state until a next WUS is received (1e-21) and (1e-25).

In the DRX operation, the terminal may report channel state information (CSI) in an active time including a time the onDuration starts. When the terminal receives WUS off information and the onDuration is not running according to the above procedure, the terminal may not report the CSI. When this situation continues, the base station may not receive a CSI report from the terminal and thus may have difficulty in adjusting a direction of a beam transmitted to the terminal. In particular, in a system that may operate even at a high frequency such as NR, when CSI is not reported for a plurality of DRX cycles, the base station may difficulty in tracking a beam direction of the terminal.

Accordingly, in an embodiment, when the terminal receives WUS off information, the following options for CSI transmission may be considered.

A first option may include a method of always transmitting periodic CSI in a time a drx-onDurationTimer is supposed to run even in a case that the drx-onDurationTimer is not running. Accordingly, regardless of WUS on/off information, the terminal may report CSI at least in a time the drx-onDurationTimer is supposed to run, so that the base station tracks a channel state and a beam direction of the terminal.

A second option may include a method of selectively reporting CSI according to conditions, in a time the drx-onDurationTimer is supposed to run. In the present option, when WUS on information is received, the drx-onDurationTimer is running, and thus the terminal may report CSI in a corresponding time. However, when WUS off information is received, if a measurement value of a current beam direction is greater than a certain threshold value, the terminal may not report CSI during a time the drx-onDurationTimer is supposed to run. However, when the measurement value is less than the certain threshold value, the terminal may report CSI in a time the drx-onDurationTimer is supposed to run, even in a case that the drx-onDurationTimer is not running. A beam direction may be referred to as a transmission configuration indicator (TCI) state in NR. A plurality of TCI states may be configured in the terminal. The terminal may activate one TCI state for PDCCH reception from among the TCI states. Accordingly, the terminal may compare a value obtained by measuring a reference signal corresponding to the TCI state activated for PDCCH reception, with the certain threshold value. Also, in an embodiment, the certain threshold value may be a value set by the base station by using an RRC message (e.g., an RRC reconfiguration message), and the base station may configure reference signal received power (RSRP) or reference signal received quality (RSRQ), or both. That is, when both RSRP and RSRQ threshold values are set, if at least one of the two conditions (e.g., the RSRP and RSRQ) deteriorates, the terminal may report CSI in a time the drx-onDurationTimer is supposed to run, even in a case that the drx-onDurationTimer is not running. Also, additionally, when a signal strength/quality in the corresponding TCI state is low, the terminal may continuously wait for a command from the base station, to receive a change in the TCI state for PDCCH reception from the base station. That is, although DRX is configured, in the above situation (e.g., when the signal strength/quality in the TCI state is low), the terminal may maintain an active time and may receive a control message of a MAC layer indicating 'TCI State Indication for UE-specific PDCCH MAC CE' to change the TCI state for PDCCH reception from the base station. In order to maintain the active time, when the above situation occurs, the terminal may start a DRX inactivity timer once with expiration of the drx-onDurationTimer. Alternatively, when the above situation occurs, the terminal may continuously maintain the active time without starting a separate timer until receiving a MAC CE. When the active time is continuously maintained, the terminal may continuously perform periodic CSI reporting.

A third option may include a method of configuring whether to report periodic CSI in a message of an RRC layer even when the WUS is off in a time the drx-onDurationTimer is supposed to run. DRX configuration information and WUS-related detailed configuration information may be configured by using an RRC reconfiguration message of the RRC layer. In this case, even when the WUS is off in a time the drx-onDurationTimer is supposed to run, whether to report periodic CSI may be configured in the RRC reconfiguration message. For example, in the case of the base station operating at a low frequency, an operation of the base station may not be greatly affected even when a beam is not tracked. For this case, the third option may be a method of semi-statically configuring this function itself. Accordingly, when periodic CSI is configured in RRC to be reported even when the WUS is off in a time the drx-onDurationTimer is supposed to run, the terminal may periodically transmit a CSI report during the corresponding time. Also, additionally, periodic CSI may be additionally configured in RRC configuration information to be reported so that the terminal performs only N reporting operations when the WUS is off in a time the drx-onDurationTimer is supposed to run. In this case, N may be an integer equal to or greater than 1. Accordingly, even when a time of the drx-onDurationTimer is long and thus multiple periodic CSI reporting operations may be performed, the number of reporting operations may be limited.

A fourth option may include a method of determining whether to report periodic CSI even when the WUS is off in a time the drx-onDurationTimer is supposed to run, according to a frequency at which a current cell operates. In NR, according to an operating frequency, a frequency of 7.125 GHz may be defined as FR1, and a frequency equal to or higher than 24.250 GHz may be defined as FR2. When all frequencies of cells in which the current terminal operates belong to FR1, if the WUS is off, the terminal may not perform periodic CSI reporting. Alternatively, when a frequency of one of cells in which the current cell operates belongs to FR2, even if the WUS is off in a time the drx-onDurationTimer is supposed to run, the terminal may perform periodic CSI reporting.

TABLE 1

| Frequency range designation | Corresponding frequency range |
|---|---|
| FR1 | 410 MHz-7125 MHz |
| FR2 | 24250 MHz-52600 MHz |

A fifth option may include a method in which when the WUS is off, the terminal does not perform periodic CSI reporting, but when a number of times reaches a number (e.g., N*DRX cycles) configured in RRC, the terminal performs reporting.

A sixth option may include a method in which a WUS message itself directly indicates whether the terminal is to report periodic CSI, in a time a next drx-onDurationTimer is supposed to run. For example, the method may be a method in which even when the base station indicates WUS off to the terminal, the terminal is indicated to report periodic CSI in a time a next drx-onDurationTimer is supposed to run.

Although the above examples have been described only for periodic CSI reporting, the same methods may be applied to other signal transmission. For example, even in the case of a sounding reference signal (SRS) for uplink channel estimation, when DRX is configured through the methods, a time when the terminal transmits a signal may be adjusted when the WUS is off.

Figure 1F:
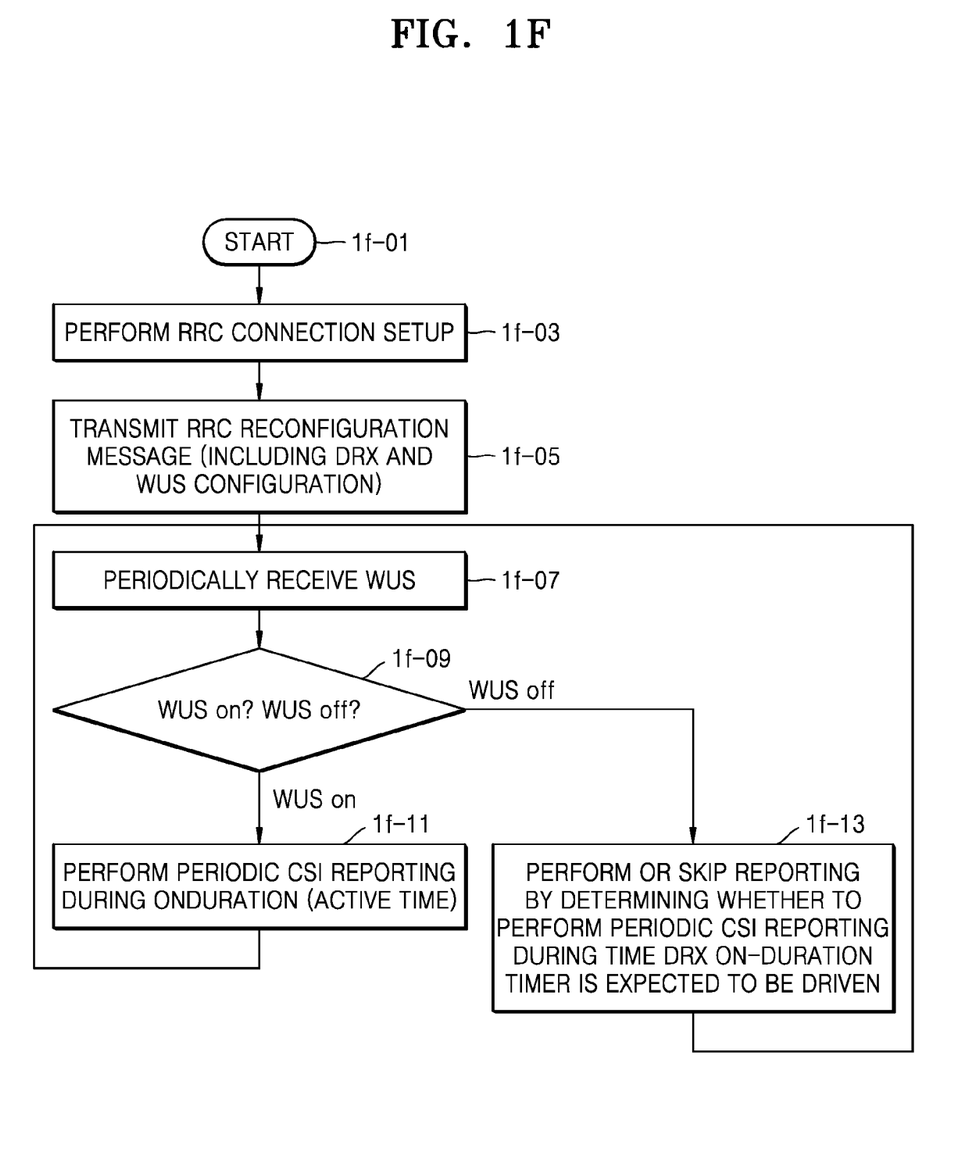
FIG. 1F is a flowchart illustrating an operation of a terminal, when a WUS and DRX are simultaneously configured, according to an embodiment of the present disclosure.

FIG. 1F is a flowchart illustrating an operation of a terminal, when a WUS and DRX are simultaneously configured, according to an embodiment of the present disclosure.

Referring to FIG. 1F, a scenario in which a terminal accesses a base station and performs connection setup for the base station may be assumed (1*f*-03). In an embodiment, the connection setup may include a procedure in which the terminal performs random access to the base station, transmits an RRC setup request message of an RRC layer, receives an RRC setup message, and transmits an RRC setup complete message.

Next, the terminal may receive various configurations from the base station, and the configurations may be transmitted by using an RRC reconfiguration message of the RRC layer (1*f*-05). The configurations may include various configuration information for adding/modifying/releasing a SCell and using the corresponding cell. Also, the above configurations may include information for configuring DRX and information about lengths of various timers used for the DRX (E.G., retransmission timer, DRX start offset, long DRX cycle, short DRX cycle, DRX short cycle timer, inactivity timer, and on-duration Timer). Also, the above configurations may include measurement configuration-related information about how to measure and how to report which downlink channel state, for downlink data transmission of a PCell and a SCell. Also, the above configurations may include a WUS-related cycle and offset information between a WUS and an onDuration (or a DRX cycle).

Accordingly, when the terminal receives RRC configuration values, the terminal may notify the base station that the corresponding RRC message has been properly received by transmitting an RRC reconfiguration complete message of the RRC layer.

According to the received configuration information, the terminal may periodically receive a WUS (1*f*-07), and may identify whether the received information is on (i.e., wake up) or off (i.e., continuously sleep) (1*f*-09).

When the WUS is on, the terminal may start a drx-onDurationTimer at a next drx-onDurationTimer starting time and may perform periodic CSI reporting including PDCCH monitoring during a corresponding time (1*f*-11).

However, when the WUS is off, the terminal may not start the next drx-onDurationTimer and may not perform PDCCH monitoring. However, for periodic CSI reporting, the terminal may select one of the following options.

For example, a first option may include a method in which the terminal always transmits periodic CSI even in a case that the drx-onDurationTimer is not running, in a time the drx-onDurationTimer is supposed to run. Accordingly, regardless of WUS on/off information, the terminal may report CSI at least in a time the drx-onDurationTimer is supposed to run, so that the base station tracks a channel state and a beam direction of the terminal.

A second option may include a method of selectively reporting CSI according to conditions, in a time the drx-onDurationTimer is supposed to run. In the present option, when WUS on is received, the drx-onDurationTimer is running, and thus the terminal may report CSI in a corresponding time. However, when WUS off information is received, if a measurement value of a current beam direction is greater than a certain threshold value, the terminal may not report CSI during a time the drx-onDurationTimer is supposed to run. However, when the measurement value is less than the certain threshold value, the terminal may report CSI in a time the drx-onDurationTimer is supposed to run, even in a case that the drx-onDurationTimer is not running. A beam direction may be referred to as a transmission configuration indicator (TCI) state in NR. Several TCI states may be configured in the terminal. The terminal may activate one TCI state for PDCCH reception from among the TCI states. Accordingly, the terminal may compare a value obtained by measuring a reference signal corresponding to the TCI state activated for PDCCH reception with the certain threshold value. Also, in an embodiment, the certain threshold value may be a value set by the base station by using an RRC message (e.g., an RRC reconfiguration message), and the base station may configure RSRP or RSRQ or both. That is, when both RSRP and RSRQ threshold values are set, if at least one of the two conditions (e.g., the RSRP and RSRQ) deteriorates, the terminal may report CSI in a time the drx-onDurationTimer is supposed to run, even in a case that the drx-onDurationTimer is not running. Also, in addition, when a signal strength/quality in the corresponding TCI state is low, the terminal may continuously wait for a command from the base station, to receive a change in the TCI state for PDCCH reception from the base station. That is, although DRX is configured, in the above situation (e.g., when the signal strength/quality in the TCI state is low), the terminal may maintain an active time and may receive a control message of a MAC layer indicating 'TCI State Indication for UE-specific PDCCH MAC CE' to change the TCI state for PDCCH reception from the base station. In order to maintain the active time, when the above situation occurs, the terminal may start a DRX inactivity timer once with expiration of the drx-onDurationTimer. Alternatively, when the above situation occurs, the terminal may continuously maintain the active time without starting a separate timer until receiving a MAC CE. When the active time is continuously maintained, the terminal may continuously perform periodic CSI reporting.

A third option may include a method of configuring whether to report periodic CSI in a message of an RRC layer even when the WUS is off in a time the drx-onDuration-Timer is supposed to run. DRX configuration information and WUS-related detailed configuration information may be configured by using an RRC reconfiguration message of the RRC layer. In this case, even when the WUS is off in a time the drx-onDurationTimer is supposed to run, whether to report periodic CSI may be configured in the RRC reconfiguration message. For example, in the case of the base station operating at a low frequency, an operation of the base station may not be greatly affected even when a beam is not tracked. For this case, the third option may be a method of semi-statically configuring this function itself. Accordingly, when periodic CSI is configured in RRC to be reported even when the WUS is off in a time the drx-onDurationTimer is supposed to run, the terminal may periodically transmit a CSI report during the corresponding time. Also, additionally, periodic CSI may be additionally configured in RRC configuration information to be reported so that the terminal performs only N reporting operations when the WUS is off, in a time the drx-onDurationTimer is supposed to run. In this case, N may be an integer equal to or greater than 1. Accordingly, even when a time of the drx-onDurationTimer is long and thus several multiple CSI reports may be performed, the number of reporting operations may be limited.

A fourth option may include a method of determining whether to report periodic CSI even when the WUS is off in a time the drx-onDurationTimer is supposed to run, according to a frequency at which a current cell operates. In NR, according to an operating frequency, a frequency of 7.125 GHz may be defined as FR1, and a frequency equal to or higher than 24.250 GHz may be defined as FR2. When all frequencies of cells in which the current terminal operates belong to FR1, if the WUS is off, the terminal may not perform periodic CSI reporting. Alternatively, when a frequency of one of cells in which the current cell operates belongs to FR2, even if the WUS is off in a time the drx-onDurationTimer is supposed to run, the terminal may perform periodic CSI reporting.

A fifth option may include a method in which when the WUS is off, the terminal does not perform periodic CSI reporting, but when a number of times reaches a number (e.g., N*DRX cycles) configured in RRC, the terminal performs reporting.

A sixth option may include a method in which a WUS message itself directly indicates whether the terminal is to report periodic CSI, in a time a next drx-onDurationTimer is supposed to run. For example, the method may be a method in which even when the base station indicates WUS off to the terminal, the terminal is indicated to report periodic CSI in a time a next drx-onDurationTimer is supposed to run.

Although the above examples have been described only for periodic CSI reporting, the same methods may be applied to other signal transmission. For example, even in the case of a sounding reference signal (SRS) for uplink channel estimation, when DRX is configured through the methods, a time when the terminal transmits a signal may be adjusted when the WUS is off.

The terminal may determine whether to perform periodic CSI reporting and may perform or skip reporting when the WUS is off through at least one of the above methods.

Figure 1G:
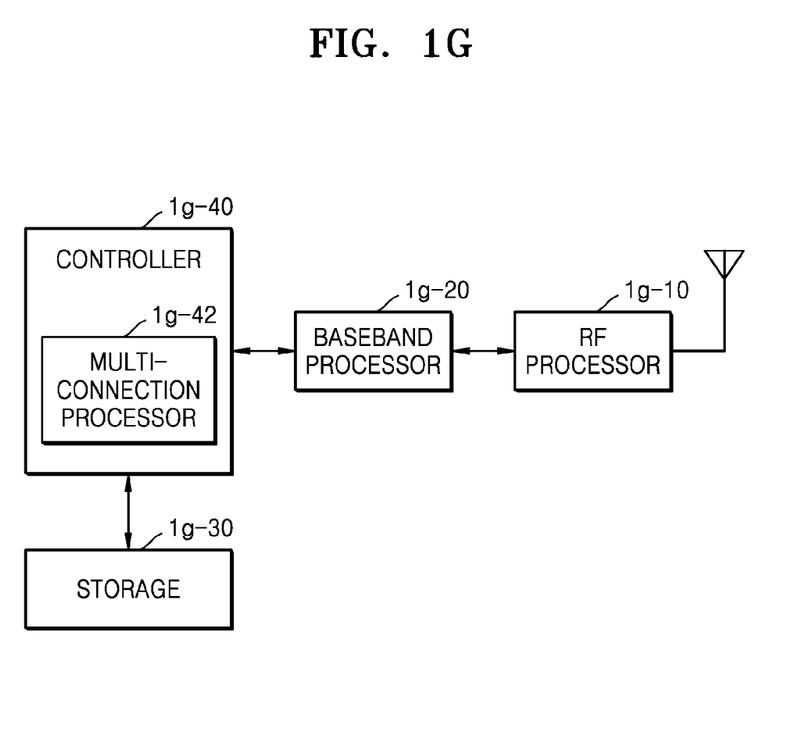
FIG. 1G is a block diagram illustrating a configuration of a terminal in a wireless communication system, according to an embodiment of the present disclosure.

FIG. 1G is a block diagram illustrating a configuration of a terminal in a wireless communication system, according to an embodiment of the present disclosure.

Referring to FIG. 1G, a terminal may include a radio frequency (RF) processor 1g-10, a baseband processor 1g-20, a storage 1g-30, and a controller 1g-40.

In an embodiment, the RF processor 1g-10 may perform a function of transmitting and receiving a signal via a wireless channel such as signal band conversion or amplification. That is, the RF processor 1g-10 may up-convert a baseband signal applied from the baseband processor 1g-20 into an RF band signal and transmit the RF band signal via an antenna, and may down-convert an RF band signal received via the antenna into a baseband signal. For example, the RF processor 1g-10 may include a transmission filter, a reception filter, an amplifier, a mixer, an oscillator, a digital-to-analog convertor (DAC), or an analog-to-digital convertor (ADC). Although only one antenna is illustrated in FIG. 1G, the terminal may include a plurality of antennas. Also, the RF processor 1g-10 may include a plurality of RF chains. Furthermore, the RF processor 1g-10 may perform beamforming. For beamforming, the RF processor 1g-10 may adjust a phase and magnitude of each of signals transmitted/received via a plurality of antennas or antenna elements.

In an embodiment, the baseband processor 1g-20 may perform a conversion function between a baseband signal and a bit stream according to the physical layer specifications of a system. For example, during data transmission, the baseband processor 1g-20 may generate complex symbols by encoding and modulating a transmitted bit stream. Also, during data reception, the baseband processor 1g-20 may reconstruct a received bit stream by demodulating and decoding a baseband signal applied from the RF processor 1g-10. For example, according to an OFDM scheme, during data transmission, the baseband processor 1g-20 may generate complex symbols by encoding and modulating a transmitted bit stream, may map the complex symbols to subcarriers, and then may configure OFDM symbols through an inverse fast Fourier transform (IFFT) operation and cyclic prefix (CP) insertion. Also, during data reception, the baseband processor 1g-20 may divide a baseband signal received from the RF processor 1g-10 into units of OFDM symbols, may reconstruct signals mapped to subcarriers through a fast Fourier transform (FFT) operation, and then may reconstruct a received bit stream through demodulation and decoding.

In an embodiment, the baseband processor 1g-20 and the RF processor 1g-10 may transmit and receive a signal as described above. Accordingly, the baseband processor 1g-20 and the RF processor 1g-10 may each be referred to as a transmitter, a receiver, a transceiver, or a communicator. Furthermore, at least one of the baseband processor 1g-20 and the RF processor 1g-10 may include a plurality of communication modules to support different radio access technologies. In addition, at least one of the baseband processor 1g-20 and the RF processor 1g-10 may include different communication modules to process signals of different frequency bands. For example, the different radio access technologies may include a wireless local area network (LAN) (e.g., Institute of Electrical And Electronics Engineers (IEEE) 802.11) and a cellular network (e.g., LTE). Also, the different frequency bands may include a super-high frequency (SHF) (e.g., 2.5 GHz or 5 GHz) band and a millimeter (mm) wave (e.g., 60 GHz) band.

In an embodiment, the storage 1g-30 may store data such as a basic program for an operation of the terminal, an application program, or configuration information. In particular, the storage 1g-30 may store information related to a wireless LAN node performing wireless communication by using wireless LAN access technology. The storage 1g-30 may provide stored data according to a request of the controller 1g-40. According to an embodiment, the storage 1g-30 may store a program for performing an operation of transmitting channel state information according to the above embodiments of the present disclosure.

In an embodiment, the controller 1g-40 may control overall operations of the terminal. For example, the controller 1g-40 may transmit and receive a signal via the baseband processor 1g-20 and the RF processor 1g-10. Also, the controller 1g-40 may record and read data to and from the storage 1g-40. To this end, the controller 1g-40 may include at least one processor. For example, the controller 1g-40 may include a communication processor (CP) for performing control for communication and an application processor (AP) for controlling a higher layer such as an application program. According to an embodiment of the present disclosure, the controller 1g-40 may include a multi-connection processor 1g-42 configured to perform a process for operating in a multi-connection mode. For example, the controller 1g-40 may control the terminal to perform a procedure shown in the operation of the terminal of FIG. 1E.

According to an embodiment, the controller 1g-40 may control a series of processes so that the terminal operates according to an embodiment of the present disclosure. For example, the controller 1g-40 may control elements of the terminal to perform a method of transmitting channel state information according to an embodiment of the present disclosure.

The controller 1g-40 according to an embodiment of the present disclosure may reduce power consumption of the terminal by allowing the terminal to perform or not to perform a certain operation according to WUS information received from a base station, and when necessary, may efficiently track a beam direction.

Figure 1H:
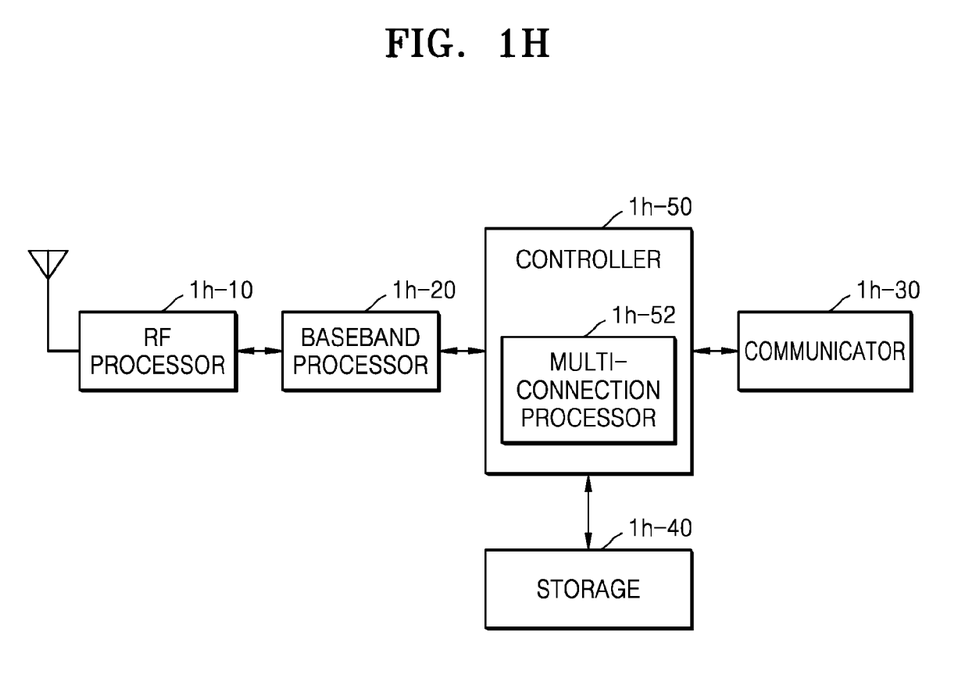
FIG. 1H is a block diagram illustrating a configuration of a base station in a wireless communication system, according to an embodiment of the present disclosure.

FIG. 1H is a block diagram illustrating a configuration of a base station in a wireless communication system, according to an embodiment of the present disclosure.

As shown in FIG. 1H, a base station may include an RF processor 1h-10, a baseband processor 1h-20, a communicator 1h-30, a storage 1h-40, and a controller 1h-50.

According to an embodiment, the RF processor 1h-10 may perform a function of transmitting and receiving a signal via a wireless channel, such as signal band conversion or amplification. That is, the RF processor 1h-10 may up-convert a baseband signal applied from the baseband processor 1h-20 into an RF band signal and transmit the RF band signal via an antenna, and may down-convert an RF band signal received via the antenna into a baseband signal. For example, the RF processor 1h-10 may include a transmission filter, a reception filter, an amplifier, a mixer, an oscillator, a DAC, or an ADC. Although only one antenna is illustrated in FIG. 1H, the base station may include a plurality of antennas. Also, the RF processor 1h-10 may include a plurality of RF chains. Furthermore, the RF processor 1h-10 may perform beamforming. For beamforming, the RF processor 1h-10 may adjust a phase and magnitude of each of signals transmitted/received through a plurality of antennas or antenna elements. The RF processor may perform a downlink multiple-input and multiple-output (MIMO) operation by transmitting on or more layers.

In an embodiment, the baseband processor 1h-20 may perform a conversion function between a baseband signal and a bit stream according to the physical layer specifications of a system. For example, during data transmission, the baseband processor 1h-20 may generate complex symbols by encoding and modulating a transmitted bit stream. Also, during data reception, the baseband processor 1h-20 may reconstruct a received bit stream by demodulating and decoding a baseband signal applied from the RF processor 1h-10. For example, according to an OFDM scheme, during data transmission, the baseband processor 1h-20 may generate complex symbols by encoding and modulating a transmitted bit stream, may map the complex symbols to subcarriers, and then may configure OFDM symbols through an IFFT operation and CP insertion. Also, during data reception, the baseband processor 1h-20 may divide a baseband signal applied from the RF processor 1h-10 into units of OFDM symbols, may reconstruct signals mapped to subcarriers through an FFT operation, and then may reconstruct a received bit stream through demodulation and decoding. The baseband processor 1h-20 and the RF processor 1h-10 may transmit and receive a signal as described above. Accordingly, the baseband processor 1h-20 and the RF processor 1h-10 may each be referred to as a transmitter, a receiver, a transceiver, a communicator, or a wireless communicator.

The communicator 1h-30 may provide an interface for performing communication with other nodes in a network. That is, the communicator 1h-30 may convert a bit stream transmitted from a primary base station to another node such as a secondary base station or a core network into a physical signal, and may convert a physical signal received from the other node into a bit stream.

The storage 1h-40 may store data such as a basic program for an operation of the primary base station, an application program, or configuration information. In particular, the storage 1h-40 may store information about a bearer allocated to an accessed terminal, a measurement result reported from the accessed terminal, and the like. Also, the storage 1h-40 may store information that is a criterion for determining whether to provide or stop multiple connections to the terminal. The storage 1h-40 may provide stored data according to a request of the controller 1h-50.

The controller 1h-50 may control overall operations of the base station. For example, the controller 1h-50 may transmit and receive a signal via the baseband processor 1h-20 and the RF processor 1h-10 or via the communicator 1h-30. Also, the controller 1h-50 may record and read data to and from the storage 1h-40. To this end, the controller 1h-50 may include at least one processor. For example, the controller 1h-50 may include a communication processor (CP) for performing control for communication and an application processor (AP) for controlling a higher layer such as an application program. According to an embodiment of the present disclosure, the controller 1h-50 may include a multi-connection processor 1h-52 configured to perform a process for operating in a multi-connection mode.

The controller 1h-50 may control a series of processes so that the base station operates according to an embodiment of the present disclosure. For example, the controller 1h-50 may control elements of the base station to perform a method of receiving channel state information in a wireless communication system according to an embodiment of the present disclosure.

According to an embodiment of the present disclosure, an operating method of a terminal in a wireless communication system may include receiving configuration information related to discontinuous reception (DRX) through radio resource control (RRC) signaling from a base station, wherein the configuration information related to the DRX includes information related to a cycle of the DRX and information related to a timer of a duration for monitoring a physical downlink control channel (PDCCH) within the cycle of the DRX, receiving configuration information about downlink control information (DCI) related to an indication of wake up in the DRX, through RRC signaling from the base station, identifying the wake up in the DRX based on the DCI, and when the wake up is not identified in the DRX, performing periodic CSI reporting, based on whether information indicating the periodic CSI reporting is included in the configuration information about the DCI.

According to an embodiment, the identifying of the wakeup in the DRX based on the DCI may include receiving the DCI from the base station, and when the DCI indicates the wake up, identifying the wake up in the DRX, and when the DCI does not indicate the wake up, not identifying the wake up in the DRX.

According to an embodiment, the information indicating the periodic CSI reporting may indicate to perform the periodic CSI reporting when the timer does not start.

According to an embodiment, the performing of the periodic CSI reporting based on whether the information indicating the periodic CSI reporting is included in the configuration information about the DCI may include, when the information indicating the periodic CSI reporting is included in the configuration information about the DCI, performing the periodic CSI reporting.

According to an embodiment, when the information indicating the periodic CSI reporting is not included in the configuration information about the DCI, the periodic CSI reporting may not be performed.

According to an embodiment, the configuration information about the DCI may include offset information between a time at which a search time of the DCI starts and a time at which the timer starts.

According to an embodiment, when the wake up is identified in the DRX, the operating method may further include performing PDCCH monitoring during the duration indicated by the information related to the timer, by starting the timer, and performing the periodic CSI reporting during the duration indicated by the information related to the timer.

According to an embodiment of the present disclosure, a terminal in a wireless communication system may include a transceiver, and at least one processor configured to receive configuration information related to discontinuous reception (DRX), through radio resource control (RRC) signaling from a base station, wherein the configuration information related to the DRX includes information related to a cycle of the DRX and information related to a timer of a duration for monitoring a physical downlink control channel (PDCCH) within the cycle of the DRX, receive configuration information about downlink control information (DCI) related to an indication of wake up in the DRX, through RRC signaling from the base station, identify the wake up in the DRX based on the DCI, and when the wake up is not identified in the DRX, perform periodic CSI reporting, based on information indicating the periodic CSI reporting is included in the configuration information about the DCI.

According to an embodiment, the at least one processor may be further configured to receive the DCI from the base station, when the DCI indicates the wake up, identify the wake up in the DRX, and when the DCI does not indicate the wake up, not identify the wake up in the DRX.

According to an embodiment, the information indicating the periodic CSI reporting may not indicate to perform the periodic CSI reporting when the timer does not start.

According to an embodiment, the at least one processor may be further configured to perform the periodic CSI reporting, when the information indicating the periodic CSI reporting is included in the configuration information about the DCI.

According to an embodiment, the periodic CSI reporting may not be performed, when the information indicating the periodic CSI reporting is not included in the configuration information about the DCI.

According to an embodiment, the configuration information about the DCI may include offset information between a time at which a search time of the DCI starts and a time at which the timer starts.

According to an embodiment, the at least one processor may be further configured to, when the wake up is identified in the DRX, perform PDCCH monitoring during the duration indicated by the information related to the timer, by starting the timer, and perform the periodic CSI reporting during the duration indicated by the information related to the timer.

According to an embodiment of the present disclosure, a computer-readable recording medium may have embodied thereon a program for performing a method including receiving configuration information related to discontinuous reception (DRX), through radio resource control (RRC) signaling from a base station, wherein the configuration information related to the DRX includes information related to a cycle of the DRX and information related to a timer of a duration for monitoring a physical downlink control channel (PDCCH) within the cycle of the DRX, receiving configuration information about downlink control information (DCI) related to an indication of wake up in the DRX, through RRC signaling from the base station, identifying the wake up in the DRX based on the DCI, and when the wake up is not identified in the DRX, performing periodic CSI reporting, based on whether information indicating the periodic CSI reporting is included in the configuration information about the DCI.

The methods according to the embodiments of the present disclosure as described in the detailed description or in the following claims may be implemented as hardware, software, or a combination of hardware and software.

When implemented as software, a computer-readable storage medium or a computer program product, which stores one or more programs (e.g., software modules), may be provided. The one or more programs that are stored in the computer-readable storage medium or the computer program product are configured to be executable by one or more processors in an electronic device. The one or more programs include instructions for allowing the electronic device to execute the methods according to the claims or embodiments of the present disclosure.

The programs (e.g., software modules or software) may be stored in a non-volatile memory including a random access memory (RAM) or a flash memory, a read-only memory (ROM), an electrically erasable programmable read-only memory (EEPROM), a magnetic disc storage device, a compact disc-ROM (CD-ROM), a digital versatile disc (DVDs), another optical storage device, or a magnetic cassette. Alternatively, the programs may be stored in a memory including any combination of some or all of the above storage media. Also, a plurality of such constituent memories may be provided.

Also, the programs may be stored in an attachable storage device that is accessible through a communication network, such as the Internet, an intranet, a local area network (LAN), a wide LAN (WLAN), or a storage area network (SAN), or a combination thereof. Such a storage device may access, via an external port, the electronic device for performing embodiments of the present disclosure. Furthermore, an additional storage device on the communication network may access the electronic device for performing embodiments of the present disclosure.

In the present disclosure, the term "computer program product" or "computer-readable recording medium" is used to totally indicate a memory, a hard disc mounted in a hard disk drive, and a medium such as a signal. The "computer program product" or the "computer-readable recording medium" is a means to be provided to the method of reporting channel state information according to the present disclosure.

In the afore-described embodiments of the present disclosure, elements included in the present disclosure are expressed in a singular or plural form according to the embodiments of the present disclosure. However, the singular or plural form is selected appropriately for a condition provided for convenience of explanation, and the present disclosure is not limited to the singular or plural form. An element expressed in a singular form may include a plurality of elements and elements expressed in a plural form may include a single element.

Particular embodiments of the present disclosure have been described in the descriptions of the present disclosure, but it will be understood that various modifications may be made without departing the scope of the present disclosure. Hence, the scope of the present disclosure is not limited to the above embodiments of the present disclosure, and may be defined by not only the following claims but also equivalents thereof.

The invention claimed is:

1. An operating method of a terminal in a wireless communication system, the operating method comprising:
    receiving, from a base station, a radio resource control (RRC) reconfiguration message including information related to a discontinuous reception (DRX)-onDurationTimer and information indicating a periodic channel status information (CSI) reporting;
    receiving, from the base station, downlink control information (DCI) including wake-up information indicating a first value or a second value; and
    in case that the wake-up information indicates the first value, not starting the DRX-onDurationTimer and performing the periodic CSI reporting based on the information indicating the periodic CSI reporting.

2. The operating method of claim 1, further comprising:
    in case that the wake-up information indicates the first value and the information indicating the periodic CSI reporting is not included in the RRC reconfiguration message, not starting the DRX-onDurationTimer and not performing the periodic CSI reporting.

3. The operating method of claim 1, further comprising:
    in case that the wake-up information indicates the second value, starting the DRX-onDurationTimer and performing the periodic CSI reporting based on the information indicating the periodic CSI reporting.

4. The operating method of claim 1, wherein the RRC reconfiguration message further comprises offset information between a time at which a search time of the DCI starts and a time at which the DRX-onDurationTimer starts.

5. The operating method of claim 1, wherein in case that the wake-up information indicates the second value, the operating method further comprises:
    performing physical downlink control channel (PDCCH) monitoring during a duration indicated by the information related to the DRX-onDurationTimer, by starting the DRX-onDurationTimer.

6. The operating method of claim 1,
    wherein the wake-up information is a wake-up signal (WUS), and
    wherein the first value indicates WUS OFF, and the second value indicates WUS ON.

7. A terminal in a wireless communication system, the terminal comprising:
    a transceiver; and
    at least one processor configured to:
        receive, from a base station, a radio resource control (RRC) reconfiguration message including information related to a discontinuous reception (DRX)-onDurationTimer and information indicating a periodic channel status information (CSI) reporting,
        receive, from the base station, downlink control information (DCI) including wake-up information indicating a first value or a second value, and
        in case that the wake-up information indicates the first value, not starting the DRX-onDuration Timer and perform the periodic CSI reporting based on the information indicating the periodic CSI reporting.

8. The terminal of claim 7, wherein the at least one processor is further configured to:
    not start the DRX-onDuration Timer and not perform the periodic CSI reporting, in case that the wake-up information indicates the first value and the information indicating the periodic CSI reporting is not included in the RRC reconfiguration message.

9. The terminal of claim 7, wherein the at least one processor is further configured to:
    start the DRX-onDurationTimer and perform the periodic CSI reporting based on the information indicating the periodic CSI reporting in case that the wake-up information indicates the second value.

10. The terminal of claim 7, wherein the RRC reconfiguration message further comprises offset information between a time at which a search time of the DCI starts and a time at which the DRX-onDurationTimer starts.

11. The terminal of claim 7, wherein the at least one processor is further configured to:
    in case that the wake-up information indicates the second value, perform physical downlink control channel (PDCCH) monitoring during a duration indicated by the information related to the DRX-onDurationTimer, by starting the DRX-onDurationTimer.

12. The terminal of claim 7,
    wherein the wake-up information is a wake-up signal (WUS), and
    wherein the first value indicates WUS OFF, and the second value, indicates WUS ON.

13. A non-transitory computer-readable recording medium having stored therein a program for performing a method comprising:
    receiving, from a base station, a radio resource control (RRC) reconfiguration message including information related to a discontinuous reception (DRX)-onDurationTimer and information indicating a periodic channel status information (CSI) reporting;
    receiving, from the base station, downlink control information (DCI) including wake-up information indicating a first value or a second value; and
    in case that the wake-up information indicates the first value, not starting the DRX-onDurationTimer and performing the periodic CSI reporting based on the information indicating the periodic CSI reporting.

* * * * *